United States Patent
Kodama et al.

(10) Patent No.: US 10,744,589 B2
(45) Date of Patent: Aug. 18, 2020

(54) METHOD OF MONITORING MANUFACTURING STATUS OF ELECTRIC RESISTANCE WELDED PIPE, DEVICE FOR MONITORING MANUFACTURING STATUS OF ELECTRIC RESISTANCE WELDED PIPE, AND METHOD OF MANUFACTURING ELECTRIC RESISTANCE WELDED PIPE

(71) Applicant: JFE STEEL CORPORATION, Tokyo (JP)

(72) Inventors: Toshifumi Kodama, Tokyo (JP); Takatoshi Okabe, Tokyo (JP); Shuichi Sato, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 354 days.

(21) Appl. No.: 15/555,039

(22) PCT Filed: Feb. 17, 2016

(86) PCT No.: PCT/JP2016/054533
§ 371 (c)(1),
(2) Date: Aug. 31, 2017

(87) PCT Pub. No.: WO2016/143473
PCT Pub. Date: Sep. 15, 2016

(65) Prior Publication Data
US 2018/0104763 A1   Apr. 19, 2018

(30) Foreign Application Priority Data
Mar. 10, 2015   (JP) .................................. 2015-047625

(51) Int. Cl.
*B23K 31/02*   (2006.01)
*B23K 13/08*   (2006.01)
(Continued)

(52) U.S. Cl.
CPC .............. *B23K 13/08* (2013.01); *B21C 37/08* (2013.01); *B21C 51/00* (2013.01);
(Continued)

(58) Field of Classification Search
CPC ...... B23K 13/00; B23K 13/02; B23K 13/025; B23K 13/043; B23K 13/06; B23K 13/08;
(Continued)

(56) References Cited

U.S. PATENT DOCUMENTS 3,585,351 A * 6/1971 Hinrichs .............. B23K 15/006
219/137 R
5,223,683 A * 6/1993 Ishizaka ................. B23K 13/08
219/110
(Continued)

FOREIGN PATENT DOCUMENTS

CA   2703892 A1   5/2009
CA   2854097 A1   5/2013
(Continued)

OTHER PUBLICATIONS

International Search Report and Written Opinion for International Application No. PCT /JP 2016/054533, dated May 24, 2016—6 Pages.
(Continued)

*Primary Examiner* — Hung D Nguyen
(74) *Attorney, Agent, or Firm* — RatnerPrestia

(57) ABSTRACT

A method of monitoring a manufacturing status of an electric resistance welded pipe manufactured by shaping a steel strip into a pipe and butt welding both end parts of the steel strip in a width direction along a lengthwise direction includes: arranging an imaging unit in a gas shield nozzle having an opening opposing a region in which both of the end parts of the steel strip in the width direction are butt welded and shielding the region with inert gas by ejecting
(Continued)

the inert gas onto the region through the opening, the imaging unit having a visual filed including the region; and determining quality of a butt-welded part based on an image shot by the imaging unit.

4 Claims, 3 Drawing Sheets

(51) Int. Cl.

| | | |
|---|---|---|
| *B21C 37/08* | (2006.01) | |
| *B21C 51/00* | (2006.01) | |
| *B23K 13/06* | (2006.01) | |
| *B23K 11/25* | (2006.01) | |
| *B23K 11/00* | (2006.01) | |
| *B23K 11/16* | (2006.01) | |
| *B23K 11/06* | (2006.01) | |
| *B23K 11/087* | (2006.01) | |
| *B23K 31/12* | (2006.01) | |
| *B23K 13/02* | (2006.01) | |
| *B23K 9/02* | (2006.01) | |
| *B23K 103/04* | (2006.01) | |
| *B23K 101/04* | (2006.01) | |

(52) U.S. Cl.
CPC ........ *B23K 11/0006* (2013.01); *B23K 11/062* (2013.01); *B23K 11/0873* (2013.01); *B23K 11/16* (2013.01); *B23K 11/252* (2013.01); *B23K 13/025* (2013.01); *B23K 13/06* (2013.01); *B23K 31/125* (2013.01); *B23K 2101/04* (2018.08); *B23K 2103/04* (2018.08)

(58) Field of Classification Search
CPC ............ B23K 11/0006; B23K 11/0873; B23K 11/062; B23K 11/16; B23K 11/25; B23K 11/252; B23K 11/253; B23K 11/34; B23K 11/36; B23K 2101/04; B23K 2101/06; B23K 2101/10; B23K 2101/18; B23K 2103/04; B21C 37/08; B21C 37/0826; B21C 37/083; B21C 51/00
USPC .......... 219/60.2, 61, 61.5, 61.7, 67, 74, 109, 219/136, 137 R, 137.42, 602, 607, 617
See application file for complete search history.

(56) References Cited

U.S. PATENT DOCUMENTS

| | | | |
|---|---|---|---|
| 5,344,062 A | | 9/1994 | Krengel et al. |
| 5,376,766 A | * | 12/1994 | Higgins ............... B23K 13/025 219/109 |
| RE35,378 E | | 11/1996 | Krengel et al. |
| 5,900,079 A | | 5/1999 | Ono et al. |
| 8,445,810 B2 | | 5/2013 | Hozumi et al. |
| 9,050,681 B2 | | 6/2015 | Hamatani et al. |
| 2010/0104888 A1 | | 4/2010 | Hamatani et al. |
| 2010/0232678 A1 | | 9/2010 | Hasegawa et al. |
| 2011/0024402 A1 | | 2/2011 | Hozumi et al. |
| 2015/0090697 A1 | | 4/2015 | Hasegawa et al. |
| 2016/0045974 A1 | * | 2/2016 | Okabe ................ B23K 11/0873 219/74 |

FOREIGN PATENT DOCUMENTS

| | | |
|---|---|---|
| CN | 101610869 A | 12/2009 |
| CN | 101909802 A | 12/2010 |
| CN | 103240515 A | 8/2013 |
| CN | 103930233 A | 7/2014 |
| EP | 0933159 A1 | 8/1999 |
| EP | 2283961 A1 | 2/2011 |
| EP | 2777859 A1 | 9/2014 |
| JP | 2006026691 A | 2/2006 |
| JP | 2008212961 A | 9/2008 |
| JP | 4374845 B2 | 12/2009 |
| JP | 2011206813 A | 10/2011 |
| JP | 5510615 B2 | 6/2014 |
| JP | 2014231084 A | 12/2014 |
| KR | 20100136523 A | 12/2010 |
| RU | 2113303 C1 | 6/1998 |
| RU | 2429093 C2 | 9/2011 |
| WO | 9500286 A1 | 1/1995 |
| WO | 2009057830 A1 | 5/2009 |
| WO | 2009057830 A1 | 3/2011 |
| WO | 2014156057 A1 | 10/2014 |

OTHER PUBLICATIONS

Ohashi et al., Seam Position Detector in Electric Resistance Welded Pipe, vol. 59, No. 8, pp. 590-593.
Chinese Office Action for Chinese Application No. 2016800112860, dated Dec. 28, 2018, with Search Report—10 pages.
Korean Office Action for Korean Application No. 10-2017-7026085, dated Sep. 8, 2018, with Concise Statement of Relevance of Office Action, 6 pages.
Russian Office Action for Russian Application No. 2017134921, dated Sep. 28, 2018 with translation, 8 pages.
Extended European Search Report for European Application No. 16761445.2, dated Oct. 12, 2018, 8 pages.
Korean Office Action for Korean Application No. 10-2017-7026085, dated Jun. 25, 2019 with Concise Statement of Relevance of Office Action, 4 pages.

* cited by examiner

METHOD OF MONITORING MANUFACTURING STATUS OF ELECTRIC RESISTANCE WELDED PIPE, DEVICE FOR MONITORING MANUFACTURING STATUS OF ELECTRIC RESISTANCE WELDED PIPE, AND METHOD OF MANUFACTURING ELECTRIC RESISTANCE WELDED PIPE

CROSS REFERENCE TO RELATED APPLICATIONS

This is the U.S. National Phase application of PCT/JP2016/054533, filed Feb. 17, 2016, which claims priority to Japanese Patent Application No. 2015-047625, filed Mar. 10, 2015, the disclosures of these applications being incorporated herein by reference in their entireties for all purposes.

FIELD OF THE INVENTION

The present invention relates to a method of monitoring a manufacturing status of an electric resistance welded pipe, a device for monitoring a manufacturing status of an electric resistance welded pipe, and a method of manufacturing the electric resistance welded pipe.

BACKGROUND OF THE INVENTION

In general, electric resistance welded pipes (hereinafter, referred to as electric resistance welded steel pipes) are manufactured by transporting a metal strip (including a metal sheet) such as a steel strip in the lengthwise direction while shaping it into a pipe, and continuously butt welding both end parts of the metal strip in the width direction along the lengthwise direction using a method such as high-frequency induction heat-pressure welding and resistance heat-pressure welding. In a process of manufacturing the electric resistance welded steel pipe, it is important to prevent foreign matters such as oxides from remaining in a butt-welded part in view of the quality control of ensuring of the strength of the butt-welded part, and the like. For the quality control of the electric resistance welded steel pipe, a technique in which flaws in the electric resistance welded steel pipe are detected while attention is mainly being focused on the butt-welded part using an ultrasonic inspection device, as disclosed in Non-Patent Literature 1, has spread.

For quality control in manufacturing of the electric resistance welded steel pipe, a technique has been proposed, in which the shape of a welded bead part is measured using an optical cutting method and the feature amount of the welded bead part is calculated from a measurement result to be used for the quality control, as disclosed in Non-Patent Literature 1. With this technique, the feature amount having a correlation with metal flow in a cross section is calculated online, thereby omitting a process of observing the cross section by interrupting a welding process to sample the butt-welded part. Furthermore, as another technique related to the quality control, there is a technique in which the feature amount of a planar shape is calculated from an image of a butt-welded part that has been shot by an imaging device and whether the feature amount of the planar shape is within a control range is determined, as disclosed in Patent Literature 2.

CITATION LIST

Patent Literature

Patent Literature 1: Japanese Patent No. 4374845
Patent Literature 2: Japanese Patent No. 5510615
Patent Literature 3: Japanese Laid-open Patent Publication No. 2011-206813
Non Patent Literature 1: Ohashi, Ode, Kondo, Senba, Honda, Naito, Hiwasa, "Seam Position Detector in Electric Resistance Welded Pipe", Mitsubishi Denki Giho, Vol. 59, No. 8, 1985, pp. 42-45.

SUMMARY OF THE INVENTION

Although the technique disclosed in Non Patent Literature 1 is effective for the quality control of the electric resistance welded steel pipe, it is difficult to reflect a flaw detection result onto manufacturing conditions because the flaw detection result and the manufacturing conditions do not uniquely link to each other. When the ultrasonic inspection device is installed in a final inspection process, loss of a product is increased in the case of the occurrence of welding failure because of increased lead time to the inspection from manufacturing. Furthermore, the technique disclosed in Patent Literature 1 enables welding power (heat input), a step of the butt-welded part, and the like to be determined accurately but has difficulty in providing a correlation between a butting state and manufacturing conditions that are closely related to each other with discharge of inclusions. By contrast, the technique disclosed in Patent Literature 2 does not cause the above-mentioned problem because the planar shape of the butt-welded part is detected.

In general, in a manufacturing line of an electric resistance welded steel pipe for a high-quality product such as a line pipe and an automobile underbody component, a pair of squeeze top rolls are provided above the electric resistance welded steel pipe in addition to a pair of squeeze side rolls. When the technique disclosed in Patent Literature 2 is applied to the manufacturing line of the electric resistance welded steel pipe for the high-quality product, the butt-welded part is located between the squeeze top rolls and water that is used for cooling or lubricating the squeeze top rolls thereby retain in the butt-welded part. Due to the retention of water, a clear image of the butt-welded part from the upper side of the electric resistance welded steel pipe is not easily provided and this makes it difficult to determine the quality of the butt-welded part. Furthermore, a nozzle for ejecting inert gas is arranged just above the butt-welded part in gas shield-combined welding that has also come into use in resistance welding in recent years. Due to this arrangement, the technique disclosed in Patent Literature 2 cannot ensure a visual field of the imaging device that is arranged above the electric resistance welded steel pipe and has difficulty in determining the quality of the butt-welded part.

In accordance with the invention disclosed in Patent Literature 3, it can be considered to employ a method in which a shield welding device covering an entire part from a heating start position of the electric resistance welded steel pipe to a welding point thereof with a shield box and supplying gas into the shield box at a predetermined flow rate is introduced, and an observation device is provided in the shield welding device. This method however causes the device configuration to be larger in size and be complicated and has a significant disadvantage in terms of efficiency, such as arising necessity of exchange and adjustment of shield jigs of an inlet and an outlet of the steel pipe every time the manufacturing size of the steel pipe is changed.

The present invention has been made in view of the above-mentioned circumstances and an object thereof is to provide a method of monitoring a manufacturing status of an electric resistance welded pipe and a device for monitoring a manufacturing status of an electric resistance welded pipe that can determine the quality of a butt-welded part of the electric resistance welded pipe without being influenced by cooling water and lubricating water even in gas shield-combined welding.

Furthermore, another object of the present invention is to provide a method of manufacturing an electric resistance welded pipe that can determine the quality of a butt-welded part of the electric resistance welded pipe without being influenced by cooling water and lubricating water even in gas shield-combined welding and prevent the occurrence of welding failure based on a determination result.

A method of monitoring a manufacturing status of an electric resistance welded pipe according to the present invention is a method of monitoring a manufacturing status of an electric resistance welded pipe manufactured by shaping a steel strip into a pipe and butt welding both end parts of the steel strip in a width direction along a lengthwise direction and includes: arranging an imaging unit in a gas shield nozzle having an opening opposing a region in which both of the end parts of the steel strip in the width direction are butt welded and shielding the region with inert gas by ejecting the inert gas onto the region through the opening, the imaging unit having a visual filed including the region; and determining quality of a butt-welded part based on an image shot by the imaging unit.

In the above-described method of monitoring a manufacturing status of an electric resistance welded pipe according to the present invention, the opening of the gas shield nozzle is located between a position at which the steel strip starts melting and a position at which both of the end parts of the steel strip in the lengthwise direction are made to butt against each other, and further includes blowing inert gas onto both of the end parts of the steel strip in the width direction through a nozzle that is different from the gas shield nozzle in a predetermined section between an induction heating start point of the steel strip and the gas shield nozzle.

A device for monitoring a manufacturing status of an electric resistance welded pipe according to the present invention is a device for monitoring a manufacturing status of an electric resistance welded pipe manufactured by shaping a steel strip into a pipe and butt welding both end parts of the steel strip in a width direction along a lengthwise direction, and includes: an imaging unit arranged in a gas shield nozzle having an opening opposing a region in which both of the end parts of the steel strip in the width direction are butt welded and shielding the region with inert gas by ejecting the inert gas onto the region through the opening, the imaging unit having a visual field including the region; and an analyzing unit configured to determine quality of a butt-welded part based on an image shot by the imaging unit.

A method of manufacturing an electric resistance welded pipe according to the present invention is a method of manufacturing an electric resistance welded pipe manufactured by shaping a steel strip into a pipe and butt welding both end parts of the steel strip in a width direction along a lengthwise direction, and includes: arranging an imaging unit in a gas shield nozzle having an opening opposing a region in which both of the end parts of the steel strip in the width direction are butt welded and shielding the region with inert gas by ejecting the inert gas onto the region through the opening, the imaging unit having a visual filed including the region; determining quality of a butt-welded part based on an image shot by the imaging unit; and manufacturing the electric resistance welded pipe based on a result of the determining.

The method of monitoring a manufacturing status of an electric resistance welded pipe and the device for monitoring a manufacturing status of an electric resistance welded pipe according to the present invention can determine the quality of a butt-welded part of the electric resistance welded pipe without being influenced by cooling water and lubricating water even in gas shield-combined welding.

The method of manufacturing an electric resistance welded pipe according to the present invention can determine the quality of a butt-welded part of the electric resistance welded pipe without being influenced by cooling water and lubricating water even in gas shield-combined welding and prevent the occurrence of welding failure based on a determination result.

DETAILED DESCRIPTION OF EMBODIMENTS OF THE INVENTION

Hereinafter, a device for monitoring a manufacturing status of an electric resistance welded pipe according to an embodiment of the present invention will be described in detail with reference to the drawings.

Figure 1:
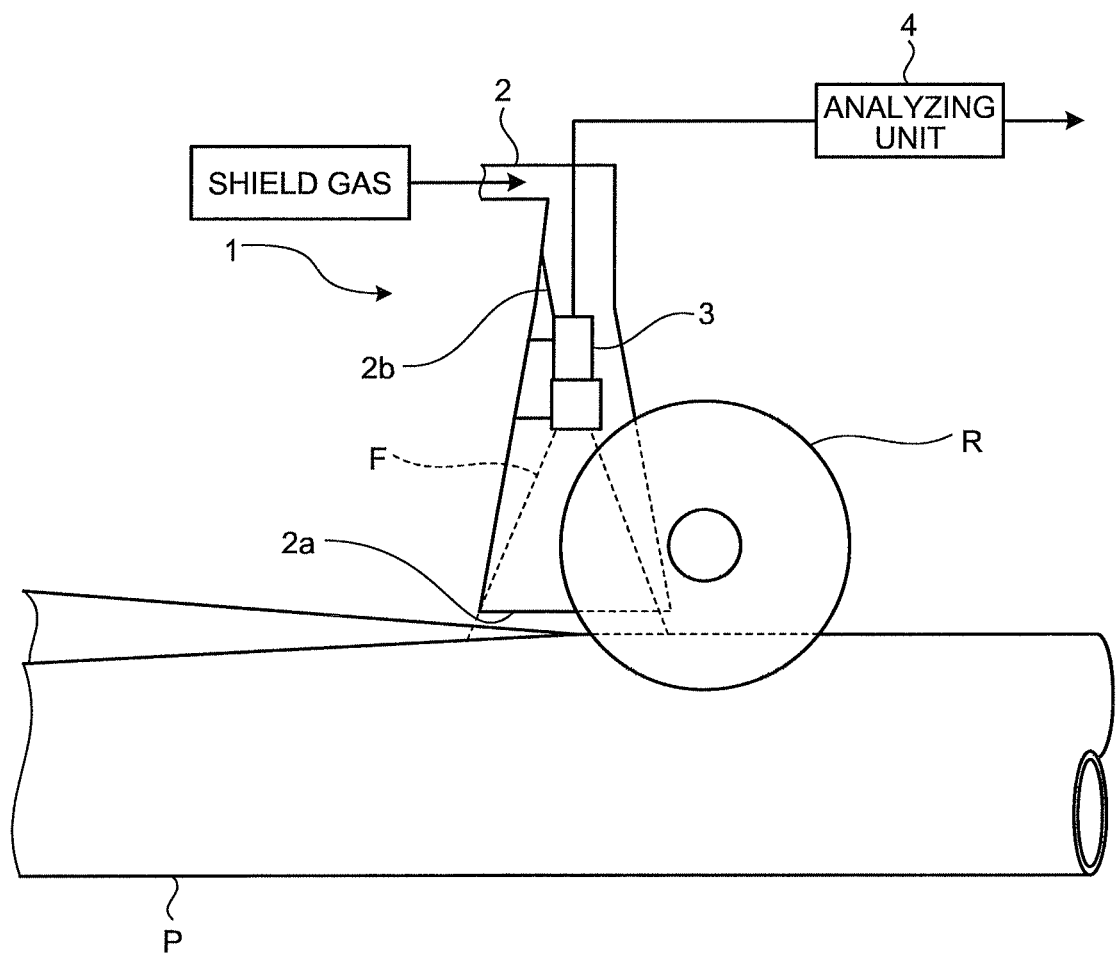
FIG. 1 is a schematic plan view illustrating the configuration of a device for monitoring a manufacturing status of an electric resistance welded pipe according to an embodiment of the present invention.

FIG. 1 is a specific plan view illustrating the configuration of the device for monitoring the manufacturing status of the electric resistance welded pipe according to the embodiment of the present invention. As illustrated in FIG. 1, this device 1 for monitoring the manufacturing status of the electric resistance welded pipe according to the embodiment of the present invention is a device for monitoring a butt-welding state of an electric resistance welded pipe (hereinafter, referred to as an electric resistance welded steel pipe) P that is manufactured by shaping a steel strip into a pipe and butt welding both end parts of the steel strip in the width direction along the lengthwise direction, and includes, as main components, a nozzle 2, an imaging unit 3, and an analyzing unit 4. The nozzle 2, the imaging unit 3, and the analyzing unit 4 function as a gas shield nozzle, an imaging unit, and an analyzing unit according to the present invention, respectively.

The nozzle 2 is a horn-shaped nozzle having an opening 2a arranged to oppose a two-dimensional region of the electric resistance welded steel pipe P including a butt-welded part and ejecting shield gas (inert gas) toward the two-dimensional region through the opening 2a to shield the two-dimensional region with the shield gas.

The dimension of the opening 2a in the lengthwise direction of the steel strip is designed to have the size of approximately 30 mm at the front and rear of the butt-welded part or the size that is larger than the size of a lengthwise visual field of the imaging unit 3. On the other hand, the dimension of the opening 2a in the width direction of the steel strip is designed to have the size of approximately 10 mm or the size that does not interfere with a pair of squeeze top rolls R arranged above the electric resistance welded steel pipe P.

A preferable butting angle of the steel strip changes in accordance with welding power and a steel strip transportation speed that are related to the sheet thickness of the steel strip, and a butt welding position on a transportation line consequently fluctuates in the lengthwise direction of the steel strip in some cases. It is therefore desired that the dimension of the opening 2a in the lengthwise direction of the steel strip is set to the size in consideration of a fluctuation width of the butt welding position or the fluctuation in the butt welding position can be made to be covered by making the nozzle 2 movable in the lengthwise direction.

Moreover, the shield gas may be supplied to the nozzle 2 using a gas supply source and a piping route (not illustrated). The gas supply source and the piping route may include a cylinder, a tank, and a piping material that are commercially available so as to be compatible with the type of the shield gas and a mechanism for adjusting the pressure and the flow rate of the shield gas may be provided according to the necessity.

The imaging unit 3 includes an imaging device fixed into the nozzle 2 by a fixing member 2b provided on the inner wall surface of the nozzle 2. The imaging unit 3 shoots an image of the butt-welded part of the electric resistance welded steel pipe P and outputs data of the shot image to the analyzing unit 4. It is desirable that a visual field F of the imaging unit 3 cover a range of 20 mm at the upstream side of the butt-welded part in the transportation direction thereof. It is desirable that the visual field of the imaging unit 3 at the downstream side in the transportation direction cover a range containing a welded bead formation portion.

Figure 2:
FIG. 2 is a view illustrating an example of an image of a butt-welded part that has been shot by an imaging unit illustrated in FIG. 1.
Figure 3:
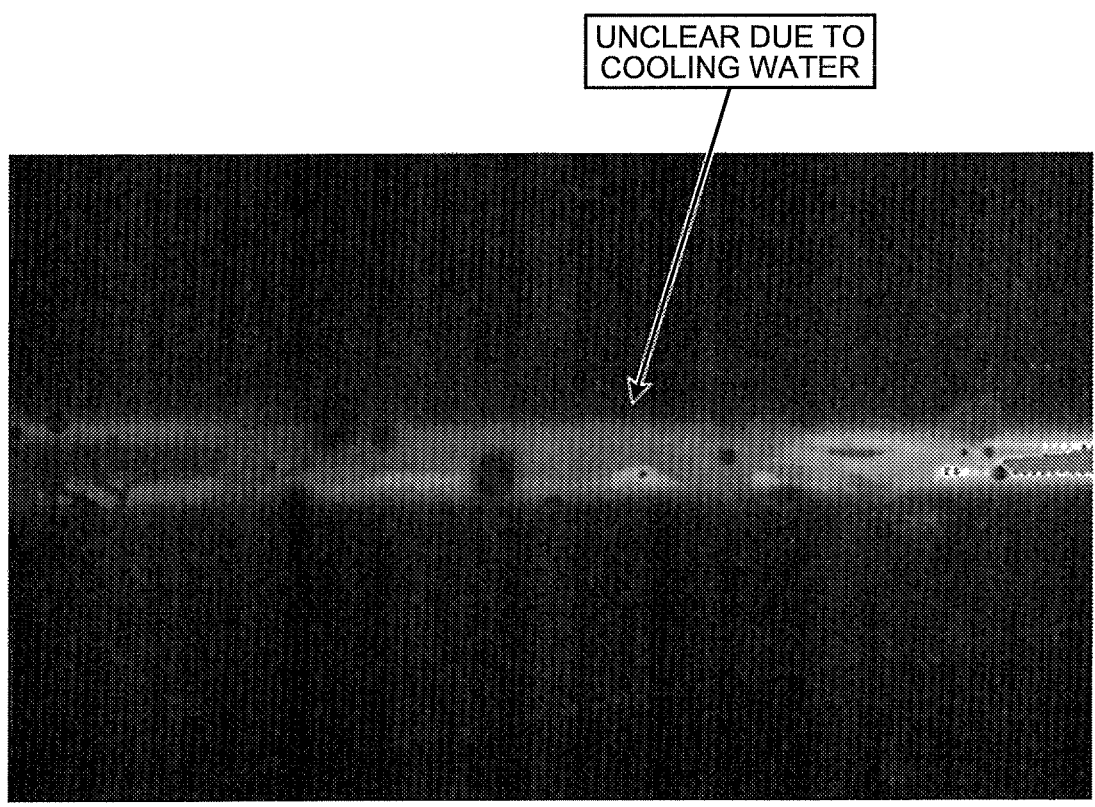
FIG. 3 is a view illustrating an example of an image of the butt-welded part that has been shot without applying shield gas or purge gas after detaching the imaging unit illustrated in FIG. 1 from a nozzle and installing it again while the same imaging conditions are being kept.

FIG. 2 is a view illustrating an example of the image of the butt-welded part that has been shot by the imaging unit. FIG. 3 is a view illustrating an example of the image of the butt-welded part that has been shot without applying the shield gas or purge gas after detaching the imaging unit 3 from the nozzle 2 and installing it while the same imaging conditions (an imaging distance, exposure time, and a diaphragm of a lens) are kept.

As is obviously seen by comparison between FIG. 2 and FIG. 3, the imaging unit 3 in the device for monitoring the manufacturing status of the electric resistance welded pipe according to the embodiment of the present invention was able to shoot the image of the butt-welded part clearly. On the other hand, when the image was shot without applying the shield gas or the purge gas after detaching the imaging unit 3 from the nozzle 2 and installing it, cooling water from the squeeze top rolls R retained in the butt-welded part and a clear image was not shot. The above-mentioned results revealed the following. That is, the imaging unit 3 in the device for monitoring the manufacturing status of the electric resistance welded pipe according to the embodiment of the present invention can clearly shoot the image of the butt-welded part of the electric resistance welded steel pipe P without being influenced by the cooling water and the lubricating water even in the gas shield-combined welding and determine the quality of the butt-welded part based on the shot image.

In terms of image processing capability of the analyzing unit 4, desirably, the exposure time of the imaging unit 3 is set to be equal to or less than 1/100000 seconds and the imaging unit 3 has the lens diaphragm and imaging sensitivity that are not saturated with the exposure time. Furthermore, it is desirable that the imaging unit 3 be configured to be reduced in size as small as possible to reduce the pipe cross-sectional area of the nozzle 2 including therein the imaging unit 3 to be as small as possible. For example, an imaging device having an electronic exposure function, which is commercially available at the current time, with the cross-sectional area of 22 mm×22 mm may be used.

The analyzing unit 4 includes an information processing device such as a personal computer. The analyzing unit 4 extracts end part positions of the steel strip in the width direction at the upstream side and the downstream side of the butt-welded part in the transportation direction from the image of the butt-welded part that has been shot by the imaging unit 3 using well-known edge extraction processing and a linear approximation method and calculates the geometric feature amount of the butt-welded part based on the extracted end part positions in the width direction. Then, the analyzing unit 4 determines the quality of the butt-welded part based on the calculated geometric feature amount and outputs a determination result to a display unit and a warning unit (not illustrated). An operator can thereby prevent welding failure from occurring by adjusting manufacturing conditions of the electric resistance welded steel pipe based on the determination result.

Figure 4:
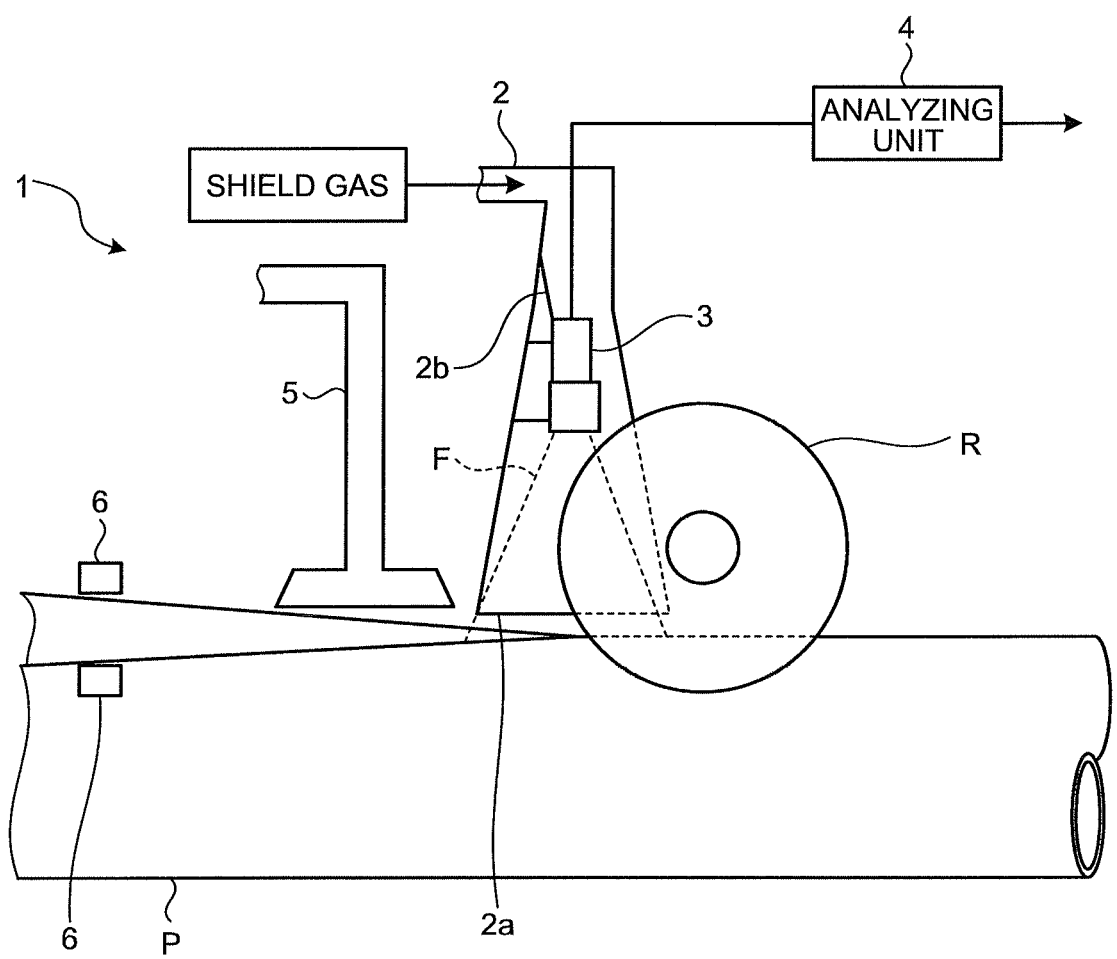
FIG. 4 is a schematic plan view illustrating the configuration of a device for monitoring the manufacturing status of the electric resistance welded pipe according to a modification of the embodiment of the present invention.

FIG. 4 is a schematic plan view illustrating the configuration of a device for monitoring the manufacturing status of the electric resistance welded pipe according to a modification of the embodiment of the present invention. As illustrated in FIG. 4, in the modification, an auxiliary nozzle 5 is arranged at the upstream side relative to the nozzle 2 in the transportation direction and inert gas is blown onto edge parts of the steel strip through the auxiliary nozzle 5. A range of the steel strip onto which the inert gas is blown through the auxiliary nozzle 5 and the visual field range of the nozzle 2 may be set to the downstream side in the transportation direction relative to the position at which the temperatures of the edge parts and the end faces of the steel strip are increased by an induction heating device 6 and reach temperatures starting oxidation with the oxygen concentration of 20.1%. The visual field range of the nozzle 2 is set to a range including the position at which the edge parts of the steel strip start melting. This arrangement can reduce the size of the opening of the nozzle 2 in the lengthwise direction to be the minimum necessary size while providing effects of the gas shield nozzle. It should be noted that operations in the modification are the same as those in the device illustrated in FIG. 1 and description thereof is therefore omitted.

Although the embodiment to which the invention made by the present inventors is applied has been described above, description and the drawings in the embodiment that configure a part of the disclosure of the present invention do not limit the present invention and the present invention also encompasses configurations provided by appropriate combinations of the above-mentioned components. That is to say, all of other embodiments, examples, operation techniques, and the like that those skilled in the art achieve based on the embodiment are encompassed in the range of the present invention.

The present invention can provide a method of manufacturing status of an electric resistance welded pipe and a device for monitoring a manufacturing status of an electric resistance welded pipe that can determine the quality of a butt-welded part of the electric resistance welded pipe without being influenced by cooling water and lubricating water even in gas shield-combined welding.

REFERENCE SIGNS LIST

1 Device for Monitoring Manufacturing Status of Electric Resistance Welded Pipe
2 Nozzle
2A Opening
3 Imaging Unit
4 Analyzing Unit
5 Auxiliary Nozzle
6 Induction Heating Device
P Electric Resistance Welded Pipe (Electric Resistance Welded Steel Pipe)

The invention claimed is:

1. A method of monitoring a manufacturing status of an electric resistance welded pipe manufactured by shaping a steel strip into a pipe and butt welding both end parts of the steel strip in a width direction along a lengthwise direction, the method comprising:
arranging an imaging unit in a gas shield nozzle having an opening opposing a region in which both of the end parts of the steel strip in the width direction are butt welded and shielding the region with inert gas by ejecting the inert gas onto the region through the opening, the imaging unit having a visual filed including the region; and
determining quality of a butt-welded part based on an image shot by the imaging unit.

2. The method of monitoring a manufacturing status of an electric resistance welded pipe according to claim 1, wherein the opening of the gas shield nozzle is located between a position at which the steel strip starts melting and a position at which both of the end parts of the steel strip in the lengthwise direction are made to butt against each other, and the method further comprising blowing inert gas onto both of the end parts of the steel strip in the width direction through a nozzle that is different from the gas shield nozzle in a predetermined section between an induction heating start point of the steel strip and the gas shield nozzle.

3. A device for monitoring a manufacturing status of an electric resistance welded pipe manufactured by shaping a steel strip into a pipe and butt welding both end parts of the steel strip in a width direction along a lengthwise direction, the device comprising:
an imaging unit arranged in a gas shield nozzle having an opening opposing a region in which both of the end parts of the steel strip in the width direction are butt welded and shielding the region with inert gas by ejecting the inert gas onto the region through the opening, the imaging unit having a visual field including the region; and
an analyzing unit configured to determine quality of a butt-welded part based on an image shot by the imaging unit.

4. A method of manufacturing an electric resistance welded pipe manufactured by shaping a steel strip into a pipe and butt welding both end parts of the steel strip in a width direction along a lengthwise direction, the method comprising:
arranging an imaging unit in a gas shield nozzle having an opening opposing a region in which both of the end parts of the steel strip in the width direction are butt welded and shielding the region with inert gas by ejecting the inert gas onto the region through the opening, the imaging unit having a visual filed including the region;
determining quality of a butt-welded part based on an image shot by the imaging unit; and
manufacturing the electric resistance welded pipe based on a result of the determining.

* * * * *